No. 795,386. PATENTED JULY 25, 1905.
G. A. CUTTER.
POWER TRANSMISSION DEVICE.
APPLICATION FILED SEPT. 28, 1903.
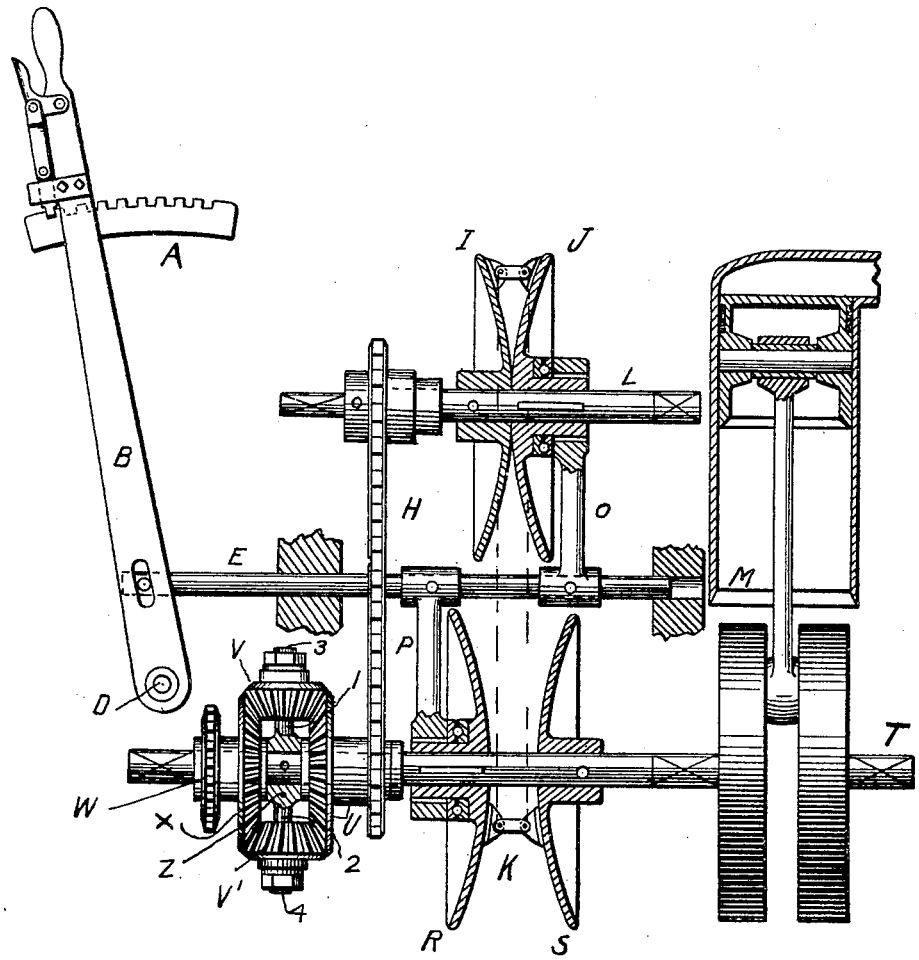
Witnesses:
F. G. Campbell
Inventor:
George A. Cutter

UNITED STATES PATENT OFFICE.

GEORGE A. CUTTER, OF NASHUA, NEW HAMPSHIRE.

POWER-TRANSMISSION DEVICE.

No. 795,386.  Specification of Letters Patent.  Patented July 25, 1905.

Application filed September 28, 1903. Serial No. 174,841.

*To all whom it may concern:*

Be it known that I, GEORGE A. CUTTER, a citizen of the United States of America, residing at Nashua, in the county of Hillsboro and State of New Hampshire, have invented certain new and useful Improvements in Power-Transmission Devices, of which the following is a specification.

The object of the invention is to produce a device of the class specified having features of novelty and advantage.

The invention is applicable as a driving means for automobiles and similar vehicles as well as to shafting and the like.

In the drawing I have illustrated an embodiment of my invention which would be applicable to automobiles, and I will describe my invention with reference thereto.

M is an explosion-motor or other source of power having its connecting-rod connected to the shaft T.

Z is one member of a differential gear, which is keyed to the shaft T. The member Z has the arms 1 2, to which are secured the beveled pinions V V', free to rotate on the studs 3 4.

U is a second member of the differential gear and is a bevel-gear loosely mounted on the shaft T and meshing with the pinions V V'. The shaft T has a rotation always in one direction, as right-handed. The gear U has a right-handed rotation, the speed of which is controlled by the variable-speed device, comprising the disks I J, mounted on the shaft L, and the disks R S, mounted on the shaft T, these disks being connected by the driving-chain K, the shaft L being connected with the driving-gear U through the chain H.

The variable-speed device, comprised of the disks I J R S, chain K, and the shifting levers, is similar to that described and claimed in an application for patent, serially numbered 162,955, filed June 24, 1903, it being understood that one disk of each pair, as R J, is movable lengthwise on its shaft, such movement being controlled by the lever B, fulcrumed at D and connected with the sliding bar E, which carries the arms O P. X is the third member of the differential gear, loosely mounted on T and having a hub to which is attached the sprocket W.

It is a property of the differential gear shown and described that when the arm member Z is rotated at a certain speed in one direction and the second member U is rotated in the same direction at a different speed the speed of the third member X may be varied from zero to a speed in either direction of rotation, depending on the relation of the speeds of Z and U. For instance, let U and X both have the same number of teeth. It is then a fact that if Z moves one hundred revolutions per minute right-handed and U two hundred revolutions per minute right-handed X will stand still—that is, it will not rotate. If the speed of Z is constant at one hundred revolutions per minute right-handed and that of U is increased above two hundred revolutions per minute, then X rotates left-handed, while if U moves less than two hundred revolutions per minute right-handed then X rotates right-handed.

The power to drive a vehicle may be taken from member X in any desired manner, as from the sprocket W.

The lever B may be provided with the usual pawl coöperating with the rack A, which for convenience may be marked to indicate the position of the lever when the carriage is in a state of rest and position of the lever corresponding to different speeds, both forward and backward, as is customary.

The operation of the device will be clear from the above. The speed of the gear U, and thus the speed of the gear X, will be controlled by the lever B, by means of which the variable-speed device I J R S is controlled. It will be seen that the motor may have a constant speed and that in spite of this the vehicle may stand still or move at any speed within its limits forward or backward.

I do not intend to limit myself to the specific constructions shown of the several parts which are combined to effect the desired result.

I claim as my invention—

A driving mechanism for automobiles and the like comprising an explosion-motor and a shaft to which it is connected; an expansible pulley mounted on said shaft; a second shaft; an expansible pulley mounted on said shaft; and a belt connecting said expansible pulleys; two differential-gear members loosely mounted on said motor-shaft and oppositely arranged, one of said members being connected with said second shaft and the other adapted to be connected with the driving-wheels of a vehicle; a differential-gear member keyed to said motor-shaft and intermeshing with said other two differential-gear members; and means for operating said expansible pulleys.

In testimony whereof I affix my signature in presence of two witnesses.

GEORGE A. CUTTER.

Witnesses:
 B. A. PEASE,
 JAMES H. HUNT.